US011108597B2

(12) United States Patent
Cheng et al.

(10) Patent No.: US 11,108,597 B2
(45) Date of Patent: Aug. 31, 2021

(54) DATA TRANSMISSION METHOD AND APPARATUS

(71) Applicant: HUAWEI TECHNOLOGIES CO., LTD., Guangdong (CN)

(72) Inventors: Meng Cheng, Shenzhen (CN); Xiuqiang Xu, Shanghai (CN); Yiqun Wu, Shanghai (CN); Yan Chen, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 111 days.

(21) Appl. No.: 16/515,665

(22) Filed: Jul. 18, 2019

(65) Prior Publication Data

US 2019/0342121 A1  Nov. 7, 2019

Related U.S. Application Data

(63) Continuation of application No. PCT/CN2018/072671, filed on Jan. 15, 2018.

(30) Foreign Application Priority Data

Jan. 24, 2017 (CN) .......................... 201710060332.2

(51) Int. Cl.
*H04L 25/02* (2006.01)
*H04J 11/00* (2006.01)
*H04L 5/00* (2006.01)

(52) U.S. Cl.
CPC .......... *H04L 25/0224* (2013.01); *H04J 11/00* (2013.01); *H04L 5/0007* (2013.01); *H04L 5/0048* (2013.01); *H04J 2011/0096* (2013.01)

(58) Field of Classification Search
None
See application file for complete search history.

(56) References Cited

U.S. PATENT DOCUMENTS 8,379,662 B2 * 2/2013 Imamura ............. H04J 13/0074
370/445
9,888,459 B2 * 2/2018 Seo ........................ H04W 48/12
(Continued)

FOREIGN PATENT DOCUMENTS

| CN | 105432034 A | 3/2016 |
| CN | 106211235 A | 12/2016 |

(Continued)

OTHER PUBLICATIONS

ZTE, "Discussion on multiple access for new radio interface", 3GPP Draft, vol. RAN WG1, Meeting #84, R1-162226,XP051079526, Busan, Korea, Apr. 11-15, 2016, 12 pages.

(Continued)

*Primary Examiner* — Phirin Sam
*Assistant Examiner* — Faiyazkhan Ghafoerkhan
(74) *Attorney, Agent, or Firm* — Fish & Richardson P.C.

(57) ABSTRACT

Example data transmission methods and apparatus are described. One example method includes obtaining at least two signature sequences used to perform multiple access for at least two to-be-sent data packets by a user equipment. The user equipment processes the at least two data packets by respectively using corresponding signature sequences, to obtain at least two transmit sequences. The user equipment sends the at least two transmit sequences to a network device on a same time-frequency resource. Then the network device obtains the at least two signature sequences used by the user equipment to send the at least two transmit sequences, and separately detects a corresponding transmit sequence based on each signature sequence, to obtain the at least two data packets. The user equipment can transmit a plurality of data packets on a same time-frequency resource in a same slot.

17 Claims, 4 Drawing Sheets

(56) References Cited

U.S. PATENT DOCUMENTS

| | | | | |
|---|---|---|---|---|
| 10,098,095 | B2* | 10/2018 | Krishna Kumar | H04L 1/0026 |
| 10,172,061 | B2* | 1/2019 | Park | H04W 16/08 |
| 10,285,083 | B2* | 5/2019 | Park | H04W 16/24 |
| 10,524,147 | B2* | 12/2019 | Park | H04W 16/24 |
| 10,856,162 | B2* | 12/2020 | Park | H04W 16/24 |
| 2009/0042561 | A1* | 2/2009 | Jackson | H04W 24/08 455/426.1 |
| 2010/0232284 | A1* | 9/2010 | Imamura | H04J 13/0074 370/210 |
| 2013/0315198 | A1* | 11/2013 | Krishna Kumar | H04L 1/1607 370/330 |
| 2014/0369434 | A1* | 12/2014 | Taherzadehboroujeni | H04B 1/707 375/261 |
| 2015/0319745 | A1* | 11/2015 | Seo | H04W 72/0406 370/329 |
| 2015/0365874 | A1* | 12/2015 | Park | H04W 36/30 370/252 |
| 2016/0049999 | A1* | 2/2016 | Taherzadeh Boroujeni | H04J 13/10 370/335 |
| 2016/0088589 | A1* | 3/2016 | Park | H04W 72/005 455/452.1 |
| 2016/0135068 | A1* | 5/2016 | Park | H04W 24/08 370/252 |
| 2016/0135069 | A1* | 5/2016 | Park | H04W 24/08 370/252 |
| 2016/0183143 | A1* | 6/2016 | Park | H04W 36/16 455/436 |
| 2016/0337149 | A1* | 11/2016 | Wu | H04L 25/03904 |
| 2016/0373934 | A1* | 12/2016 | Lee | H04W 56/005 |
| 2016/0374037 | A1* | 12/2016 | Lee | H04L 25/03872 |
| 2017/0331577 | A1* | 11/2017 | Parkvall | H04J 11/0079 |
| 2017/0331670 | A1* | 11/2017 | Parkvall | H04B 7/0617 |
| 2018/0191469 | A1* | 7/2018 | Zou | H04L 1/18 |

FOREIGN PATENT DOCUMENTS

| | | |
|---|---|---|
| CN | 106331984 A | 1/2017 |
| JP | 2016526824 A | 9/2016 |
| WO | 2015113258 A1 | 8/2015 |
| WO | WO-2015113258 A1 * | 8/2015 ............ H04W 74/08 |

OTHER PUBLICATIONS

HTC, "Hard retransmission in grant-free NOMA", 3GPP Draft, vol. RAN WG1, Meeting #87, R1-1701009, KP051208524, Spokane, USA, Jan. 16-20, 2017, 5 pages.

ZTE, "Contention-based non-orthogonal multiple access for UL mMTC" 3GPP TSG RAN WG1 Meeting #85, R1-164269, Agenda Item:7.1.3.2, Nanjing, China, May 23-27, 2016, 6 pages.

Office Action issued in Chinese Application No. 201710060332.2 dated Jan. 19, 2020, 18 pages (With English Translation).

Extended European Search Report issued in European Application No. 18744227.2 dated Jan. 7, 2020, 10 pages.

PCT International Search Report and Written Opinion in International Application No. PCT/CN2018/072,671, dated Apr. 8, 2018, 17 pages (With English Translation).

Office Action issued in Japanese Application No. 2019-538624 dated Sep. 15, 2020, 11 pages (with English translation).

* cited by examiner

DATA TRANSMISSION METHOD AND APPARATUS

CROSS-REFERENCE TO RELATED APPLICATIONS

This application is a continuation of International Patent Application No. PCT/CN2018/072671, filed on Jan. 15, 2018, which claims priority to Chinese Patent Application No. 201710060332.2, filed on Jan. 24, 2017, The disclosures of the aforementioned applications are hereby incorporated by reference in their entireties.

TECHNICAL FIELD

This application relates to communications technologies, and in particular, to a data transmission method and apparatus.

BACKGROUND

As one of core technologies at a physical layer of wireless communications, multiple access enables a wireless base station to distinguish between and serve a plurality of user equipments (UE) and reduce interference (multiple access interference) between the UEs. A simple orthogonal multiple access mode is usually used in a wireless communications system. To be specific, a plurality of users access the system by using resources orthogonally divided in different dimensions (frequency division, time division, code division, and the like). For example, an orthogonal frequency division multiple access (OFDMA) technology used in a long term evolution (LTE) system is one of orthogonal multiple access modes.

For LTE systems, in a design of an OFDMA system (for example, a URLLC service), total time-frequency resources in the system are divided into several parts. The parts are time-frequency resource ranges orthogonal to each other. When uplink data needs to be transmitted, OFDMA user equipment may select a corresponding time-frequency resource part for each data packet in a manner such as scheduling, semi-persistent scheduling, or grant-free transmission, to perform data transmission.

However, when an OFDMA transmission mechanism is used to transmit data, in the OFDMA technology, a quantity of users allowed to access the system is directly proportional to a quantity of orthogonal resources, and the quantity of orthogonal resources is restricted by an orthogonality requirement. Therefore, service requirements such as continuous wide-area coverage, high-capacity hotspot, massive connections, and low-latency access in a coming 5G era cannot be met.

SUMMARY

This application provides a data transmission method and apparatus, so as to meet service requirements such as continuous wide-area coverage, high-capacity hotspot, massive connections, and low-latency access in a coming 5G era.

According to a first aspect of this application, a data transmission method is provided, including:

obtaining, by user equipment, at least two signature sequences used to perform multiple access for at least two to-be-sent data packets;

processing, by the user equipment, the at least two data packets by respectively using corresponding signature sequences, to obtain at least two transmit sequences; and sending, by the user equipment, the at least two transmit sequences to a network device on a same time-frequency resource.

In the solution, the user equipment performs multiple-access processing on a plurality of data packets by respectively using different signature sequences, to obtain a plurality of transmit sequences, and sends the plurality of transmit sequences to the network device on a same time-frequency resource. The network device may perform reception detection by using the different signature sequences, to obtain the data packets. In this way, utilization of time-frequency resources can be improved, a packet queuing time is shortened, and transmission efficiency is improved.

In an implementation, the obtaining, by user equipment, at least two signature sequences used to perform multiple access for at least two to-be-sent data packets includes:

selecting, by the user equipment from available signature sequences, signature sequences having a one-to-one correspondence with the data packets.

In another implementation, the obtaining, by user equipment, at least two signature sequences used to perform multiple access for at least two to-be-sent data packets includes:

sending, by the user equipment, scheduling information to the network device, where the scheduling information is used to indicate that the user equipment needs to upload data and indicate an amount of data to be sent by the user equipment;

receiving, by the user equipment, a scheduling acknowledgment message returned by the network device; and determining, by the user equipment, the at least two signature sequences based on the scheduling acknowledgment message.

In the foregoing solution, the signature sequences that are obtained by the user equipment and have a one-to-one correspondence with the to-be-sent data packets may be selected by the user equipment from available sequences, or may be selected by the network device based on an amount of data to be sent by the user equipment and then notified to the user equipment. The network device only needs to give a simple indication, and the user equipment may determine, based on the indication, specific signature sequences to be used. This is not limited in this solution.

Optionally, the method further includes:

sending, by the user equipment, a pilot to the network device, where information about the pilot is used to indicate the at least two signature sequences used by the user equipment to perform multiple access for the at least two data packets.

Optionally, the method further includes:

sending, by the user equipment to the network device through a control channel, control information used to indicate the at least two signature sequences.

In the foregoing solution, after selecting the signature sequences for multiple access, the user equipment needs to notify the network device of the signature sequences, so that the network device may perform reception detection by using the signature sequences, to obtain the data packets. Specifically, the signature sequences may be notified to the network device by using the information about the pilot or the control information that is transmitted through the control channel. Alternatively, the network device may be notified of the signature sequences in another manner. This is not limited in this solution.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

In the foregoing solution, a plurality of data packets sent by the user equipment on a same time-frequency resource may be initially transmitted packets of all data packets, or may be initially transmitted packets of some data packets and retransmitted packets of other data packets, or may all be retransmitted packets of data packets, where a quantity of retransmissions of each data packet may differ from each other. This is not limited in this application.

According to a second aspect of this application, a data transmission method is provided, including:

receiving, by a network device, at least two transmit sequences sent by user equipment;

obtaining, by the network device, at least two signature sequences used by the user equipment to send the at least two transmit sequences; and separately detecting, by the network device, a corresponding transmit sequence based on each signature sequence, to obtain at least two data packets.

In this solution, after receiving the at least two transmit sequences sent by the user equipment, the network device obtains the at least two signature sequences used by the user equipment to send the at least two transmit sequences, and separately detects a corresponding transmit sequence based on each signature sequence, to obtain the at least two data packets. The user equipment can transmit a plurality of data packets on a same time-frequency resource in a same slot, thereby improving utilization of time-frequency resources, shortening a packet queuing time, and improving data transmission efficiency.

In an implementation, the obtaining, by the network device, at least two signature sequences used by the user equipment to send the at least two transmit sequences includes:

receiving, by the network device, a pilot sent by the user equipment, and obtaining the at least two signature sequences based on the pilot, where information about the pilot is used to indicate the at least two signature sequences used by the user equipment to send the at least two transmit sequences.

Optionally, the obtaining, by the network device, at least two signature sequences used by the user equipment to send the at least two transmit sequences includes:

receiving, by the network device, control information that is sent by the user equipment through a control channel and that is used to indicate the at least two signature sequences, and obtaining the at least two signature sequences based on the control information.

Optionally, before the receiving, by a network device, at least two transmit sequences sent by user equipment, the method further includes:

receiving, by the network device, scheduling information sent by the user equipment, where the scheduling information is used to indicate that the user equipment needs to upload data and indicate an amount of data to be sent by the user equipment;

scheduling, by the network device, bandwidth for the user equipment based on the scheduling information, and selecting, from available signature sequences, signature sequences having a one-to-one correspondence with data packets indicated by the amount of data; and returning, by the network device, a scheduling acknowledgment message to the user equipment, where the scheduling acknowledgment message is used to indicate the at least two signature sequences.

It can be learned from the foregoing several solutions that, a plurality of signature sequences used by the user equipment to perform multiple access may be selected by the user equipment, or may be selected by the network device based on the amount of data of the user equipment and notified to the user equipment. This is not limited in this solution.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

In the solution, a plurality of data packets that are sent by the user equipment on a same time-frequency resource and that are received by the network device may be initially transmitted packets of all data packets, or may be initially transmitted packets of some data packets and retransmitted packets of other data packets, or may all be retransmitted packets of data packets, where a quantity of retransmissions of each data packet may differ from each other. This is not limited in this application.

According to a third aspect of this application, a data transmission apparatus is provided, including:

a processing module, configured to obtain at least two signature sequences used to perform multiple access for at least two to-be-sent data packets, where the processing module is further configured to process the at least two data packets by respectively using corresponding signature sequences, to obtain at least two transmit sequences; and a sending module, configured to send the at least two transmit sequences to a network device on a same time-frequency resource.

In an implementation, the processing module is specifically configured to select, from available signature sequences, signature sequences having a one-to-one correspondence with the data packets.

In another implementation, the sending module is further configured to send a pilot to the network device, where information about the pilot is used to indicate the at least two signature sequences used by the user equipment to perform multiple access for the at least two data packets.

Optionally, the sending module is further configured to send, to the network device through a control channel, control information used to indicate the at least two signature sequences.

Optionally, the apparatus further includes: a receiving module;

the sending module is specifically configured to send scheduling information to the network device, where the scheduling information is used to indicate that the user equipment needs to upload data and indicate an amount of data to be sent by the user equipment;

the receiving module is configured to receive a scheduling acknowledgment message returned by the network device; and the processing module is configured to determine the at least two signature sequences based on the scheduling acknowledgment message.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

According to a fourth aspect of this application, a data transmission apparatus is provided, including:

a receiving module, configured to receive at least two transmit sequences sent by user equipment; and a processing module, configured to obtain at least two signature sequences used by the user equipment to send the at least two transmit sequences, where the processing module is further configured to separately detect a corresponding transmit sequence based on each signature sequence, to obtain at least two data packets.

In an implementation, the receiving module is further configured to receive a pilot sent by the user equipment; and the processing module is further configured to obtain the at least two signature sequences based on the pilot, where information about the pilot is used to indicate the at least two signature sequences used by the user equipment to send the at least two transmit sequences.

In another implementation, the receiving module is further configured to receive control information that is sent by the user equipment through a control channel and that is used to indicate the at least two signature sequences; and the processing module is further configured to obtain the at least two signature sequences based on the control information.

Optionally, the apparatus further includes: a sending module;

the receiving module is further configured to receive scheduling information sent by the user equipment, where the scheduling information is used to indicate that the user equipment needs to upload data and indicate an amount of data to be sent by the user equipment;

the processing module is further configured to: schedule bandwidth for the user equipment based on the scheduling information, and select, from available signature sequences, signature sequences having a one-to-one correspondence with data packets indicated by the amount of data; and the sending module is configured to return a scheduling acknowledgment message to the user equipment, where the scheduling acknowledgment message is used to indicate the at least two signature sequences.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

According to a fifth aspect of this application, user equipment is provided, including:

a processor, configured to:

obtain at least two signature sequences used to perform multiple access for at least two to-be-sent data packets, and process the at least two data packets by respectively using corresponding signature sequences, to obtain at least two transmit sequences; and a transmitter, configured to send the at least two transmit sequences to a network device on a same time-frequency resource.

In an implementation, the processor is specifically configured to select, from available signature sequences, signature sequences having a one-to-one correspondence with the data packets.

In another implementation, the transmitter is further configured to send a pilot to the network device, where information about the pilot is used to indicate the at least two signature sequences used by the user equipment to perform multiple access for the at least two data packets.

Optionally, the transmitter is further configured to send, to the network device through a control channel, control information used to indicate the at least two signature sequences.

Optionally, the user equipment further includes: a receiver;

the transmitter is specifically configured to send scheduling information to the network device, where the scheduling information is used to indicate that the user equipment needs to upload data and indicate an amount of data to be sent by the user equipment;

the receiver is configured to receive a scheduling acknowledgment message returned by the network device; and the processor is configured to determine the at least two signature sequences based on the scheduling acknowledgment message.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

In the foregoing user equipment solution, the user equipment may further include a memory, and there is at least one processor configured to execute an execution instruction stored in the memory, so that the user equipment exchanges data with the network device through a communications interface, to perform the data transmission method provided in the first aspect or various implementations of the first aspect.

According to a sixth aspect of this application, a network device is provided, including:

a receiver, configured to receive at least two transmit sequences sent by user equipment; and a processor, configured to:

obtain at least two signature sequences used by the user equipment to send the at least two transmit sequences; and separately detect a corresponding transmit sequence based on each signature sequence, to obtain at least two data packets.

In an implementation, the receiver is further configured to receive a pilot sent by the user equipment; and the processor is further configured to obtain the at least two signature sequences based on the pilot, where information about the pilot is used to indicate the at least two signature sequences used by the user equipment to send the at least two transmit sequences.

In another implementation, the receiver is further configured to receive control information that is sent by the user equipment through a control channel and that is used to indicate the at least two signature sequences; and the processor is further configured to obtain the at least two signature sequences based on the control information.

Optionally, the network device further includes: a transmitter;

the receiver is further configured to receive scheduling information sent by the user equipment, where the scheduling information is used to indicate that the user equipment needs to upload data and indicate an amount of data to be sent by the user equipment;

the processor is further configured to: schedule bandwidth for the user equipment based on the scheduling information, and select, from available signature sequences, signature sequences having a one-to-one correspondence with data packets indicated by the amount of data; and the transmitter is configured to return a scheduling acknowledgment message to the user equipment, where the scheduling acknowledgment message is used to indicate the at least two signature sequences.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

The foregoing network device may further include a memory, and there is at least one processor configured to execute an execution instruction stored in the memory, so that the network device exchanges data with the user equipment through a communications interface, to perform the data transmission method provided in the second aspect or various implementations of the second aspect.

According to a seventh aspect of this application, a storage medium is provided, including a readable storage medium and an executable instruction (also referred to as a computer program), where when at least one processor of user equipment executes the executable instruction, the user equipment performs the data transmission method provided in the first aspect or various implementations of the first aspect.

According to an eighth aspect of this application, a storage medium is provided, including a readable storage medium and an executable instruction, where when at least one processor of a network device executes the executable instruction, the network device performs the data transmission method provided in the second aspect or various implementations of the second aspect.

According to a ninth aspect of this application, a program product is provided, where the program product includes an executable instruction, and the executable instruction is stored in a readable storage medium. At least one processor of user equipment may read the executable instruction from the readable storage medium, and the at least one processor executes the executable instruction, so that the user equipment performs the data transmission method provided in the first aspect or various implementations of the first aspect.

According to a tenth aspect of this application, a program product is provided, where the program product includes an executable instruction, and the executable instruction is stored in a readable storage medium. At least one processor of a network device may read the executable instruction from the readable storage medium, and the at least one processor executes the executable instruction, so that the network device performs the data transmission method provided in the second aspect or various implementations of the second aspect.

According to the data transmission method and apparatus provided in this application, the user equipment obtains the at least two signature sequences used to perform multiple access for the at least two to-be-sent data packets, then processes the at least two data packets by respectively using corresponding signature sequences, to obtain the at least two transmit sequences, and then sends the at least two transmit sequences to the network device on a same time-frequency resource. After receiving the at least two transmit sequences sent by the user equipment, the network device obtains the at least two signature sequences used by the user equipment to send the at least two transmit sequences, and separately detects a corresponding transmit sequence based on each signature sequence, to obtain the at least two data packets. The user equipment can transmit a plurality of data packets on a same time-frequency resource in a same slot, thereby improving utilization of time-frequency resources, shortening a packet queuing time, and improving data transmission efficiency.

DESCRIPTION OF EMBODIMENTS

Figure 1:
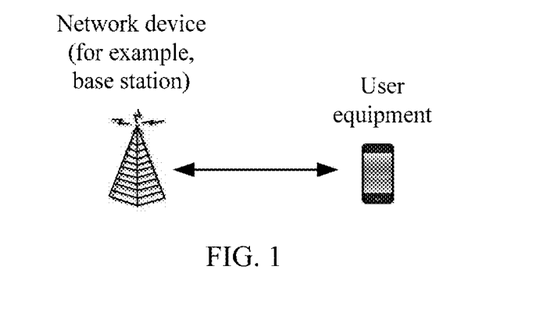
FIG. 1 is a schematic diagram of a system architecture of a data transmission method according to this application.

The technical solution in this application may be applied to a cellular communications system such as a 5G system. FIG. 1 is a schematic diagram of a system architecture of a data transmission method according to this application. As shown in FIG. 1, the system architecture includes a network device (for example, a base station shown in the figure) and user equipment such as a mobile phone or a communication tablet. In the foregoing architecture, the network device is a base station or another device that can provide a base station function on a network side, and provides a communication service for the user equipment. Particularly, in device-to-device (D2D) communication, the network device may further be a terminal that undertakes the base station function. In addition, a base station is also referred to as a radio access network (RAN) device, and is a device that connects a terminal to a wireless network. Alternatively, the base station in the foregoing architecture may be a base transceiver station (BTS) in global system for mobile communications (GSM) or code division multiple access (CDMA); or may be a nodeB (NB) in wideband code division multiple access (WCDMA); or may be an evolved nodeB (eNB or eNodeB) in long term evolution (LTE), a relay station or an access point, a base station in a 5G network, or the like. This is not limited herein.

The data transmission method provided in this application is based on the foregoing architecture and can support concurrent sending of a plurality of data packets by the UE on a same time-frequency resource in a same slot in an uplink non-orthogonal multiple access system, thereby improving utilization of time-frequency resources, shortening a packet queuing time, and increasing a potential maximum quantity of retransmissions, to adapt to a requirement of faster data exchange in the future.

Figure 2:
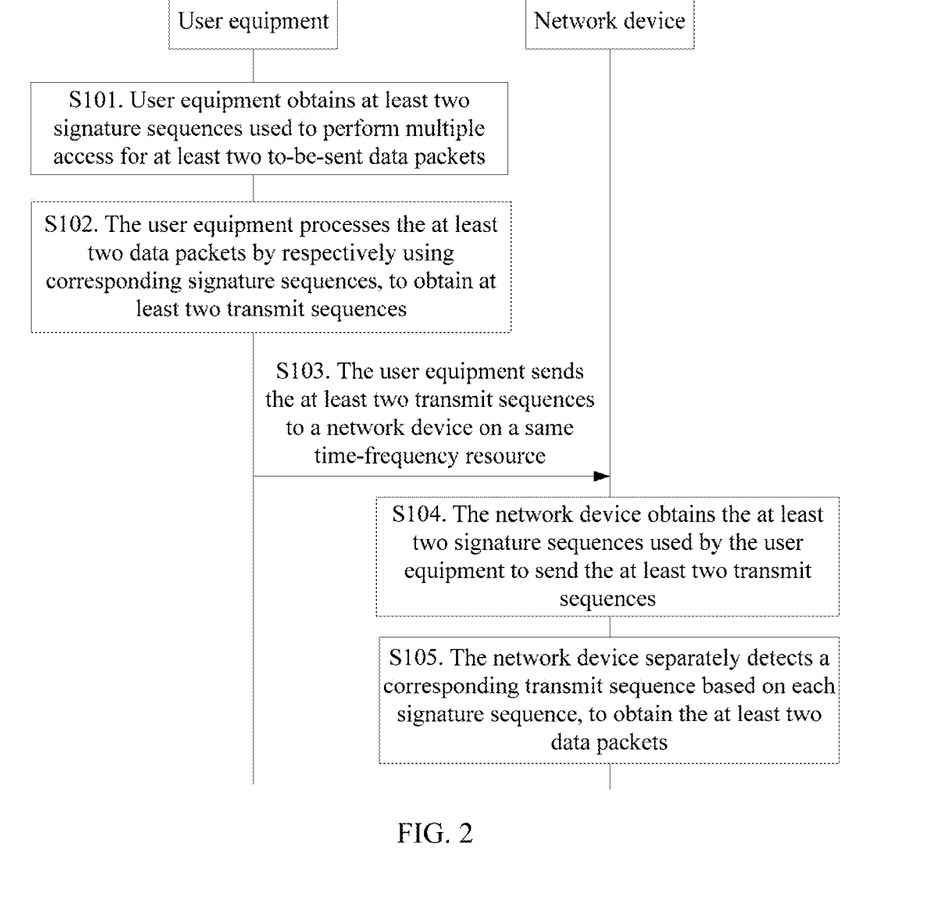
FIG. 2 is a schematic flowchart of Embodiment 1 of a data transmission method according to this application.

FIG. 2 is a schematic flowchart of Embodiment 1 of a data transmission method according to this application. As shown in FIG. 2, based on the schematic diagram of the architecture shown in FIG. 1, the method for data transmission between a network device and user equipment specifically includes the following steps.

S101. The user equipment obtains at least two signature sequences used to perform multiple access for at least two to-be-sent data packets.

In this step, the user equipment needs to send uplink data to the network device, for example, needs to send a plurality of data packets to the network device. Channel encoding may be performed separately on the data packets. The plurality of data packets may be a plurality of different transport blocks (TB) of a quantity the same as that of the data packets or may be different segments of a same TB. In this case, a plurality of signature sequences used for multiple access are needed to process corresponding data packets respectively. Therefore, the user device needs to first obtain at least two signature sequences. In the solution, a signature sequence is used to distinguish a data layer used by a data packet on a time-frequency resource. The signature sequence may be a codebook in sparse code multiple access (SCMA) and polarization division multiple access (PDMA), or a spreading sequence based on multi-user shared access (MUSA).

There are at least the following several specific manners of obtaining a signature sequence:

In a first manner, the user equipment selects, from available signature sequences, signature sequences having a one-to-one correspondence with data packets. In other words, the user equipment selects and obtains the foregoing required plurality of signature sequences.

Optionally, in the first manner of obtaining a signature sequence, because the user equipment obtains the plurality of signature sequences, a network device side does not know specific signature sequences used by the user equipment. Therefore, the UE needs to notify the network device of the plurality of used signature sequences. The UE may send a pilot to the network device, where information about the pilot may indicate the plurality of signature sequences used by the user equipment to perform multiple access for the plurality of data packets. The information about the pilot herein may be an offset, an index, or the like, so that the network device may directly determine, based on the information about the pilot, the signature sequences used by the user equipment.

The user equipment may alternatively send, to the network device through a control channel, control information used to indicate the plurality of signature sequences, so that the network device determines, based on the control information, the signature sequences used by the user equipment.

In a second manner, the user equipment sends scheduling information to the network device, where the scheduling information is used to indicate that the user equipment needs to upload data and indicate an amount of data to be sent by the user equipment. For example, a data scheduling request, a buffer status report, or the like may be used for the indication. The network device receives the scheduling information sent by the user equipment; performs scheduling processing based on the scheduling information of the user equipment to schedule bandwidth for the user equipment; selects, from available signature sequences, signature sequences having a one-to-one correspondence with a plurality of data packets to be uploaded by the user equipment; and returns a scheduling acknowledgment message to the user equipment, where the scheduling acknowledgment message is used to indicate the at least two signature sequences. The user equipment receives the scheduling acknowledgment message returned by the network device, and determines the at least two signature sequences based on the scheduling acknowledgment message.

S102. The user equipment processes the at least two data packets by respectively using corresponding signature sequences, to obtain at least two transmit sequences.

In this step, the user equipment encodes different transport blocks separately to obtain a plurality of data packets, and then performs multiple-access processing by using corresponding signature sequences to obtain modulation symbols, namely, a plurality of transmit sequences, on a plurality of data layers.

S103. The user equipment sends the at least two transmit sequences to the network device on a same time-frequency resource.

In this step, the user equipment transmits a plurality of transmit sequences on a same time-frequency resource, namely, a resource in same time domain and same frequency domain. Therefore, the network device can detect and receive, on the same time-frequency resource, the plurality of transmit sequences sent by the user equipment.

S104. The network device obtains the at least two signature sequences used by the user equipment to send the at least two transmit sequences.

In this step, to perform reception detection to obtain the data packets, the network device needs to know the plurality of signature sequences used by the user equipment to send the data packets. A specific obtaining manner may be as follows:

In a first manner, the network device receives a pilot sent by the user equipment, and obtains the at least two signature sequences based on the pilot, where information about the pilot is used to indicate the at least two signature sequences used by the user equipment to send the at least two transmit sequences.

In a second manner, the network device receives control information that is sent by the user equipment through a control channel and that is used to indicate the at least two signature sequences, and obtains the at least two signature sequences based on the control information.

In a third manner, before receiving the plurality of transmit sequences, the network device receives scheduling information sent by the user equipment, where the scheduling information is used to indicate that the user equipment needs to upload data and indicate an amount of data to be sent by the user equipment. The network device schedules bandwidth for the user equipment based on the scheduling information; selects, from available signature sequences, signature sequences having a one-to-one correspondence with data packets indicated by the amount of data; and returns the selected plurality of signature sequences to the user equipment by using a scheduling acknowledgment message.

S105. The network device separately detects a corresponding transmit sequence based on each signature sequence, to obtain the at least two data packets.

In this step, the network device performs reception detection on the received plurality of transmit sequences based on the obtained plurality of signature sequences, to obtain the plurality of data packets sent by the user equipment.

In the foregoing solution, for the plurality of data packets sent by the user equipment, the plurality of data packets sent by the user equipment on a same time-frequency resource may be initially transmitted packets of all data packets, or may be initially transmitted packets of some data packets and retransmitted packets of other data packets, or may all be retransmitted packets of data packets, where a quantity of retransmissions of each data packet may differ from each other. This is not limited in this application.

For example, there are two data packets. The plurality of data packets include: an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet. When there are a plurality of retransmitted packets, a quantity of retransmissions of each data packet may differ from each other.

According to the data transmission method provided in this embodiment, the user equipment obtains the at least two signature sequences used to perform multiple access for the at least two to-be-sent data packets, then processes the at least two data packets by respectively using corresponding signature sequences, to obtain the at least two transmit sequences, and then sends the at least two transmit sequences to the network device on a same time-frequency resource. After receiving the at least two transmit sequences sent by the user equipment, the network device obtains the at least two signature sequences used by the user equipment to send the at least two transmit sequences, and separately detects a corresponding transmit sequence based on each signature sequence, to obtain the at least two data packets. The user equipment can transmit a plurality of data packets on a same time-frequency resource in a same slot, thereby improving utilization of time-frequency resources, shortening a packet queuing time, and improving data transmission efficiency.

Based on the foregoing embodiment, the following lists, by using a base station as an example, some typical procedures of transmitting data packets concurrently on a same time-frequency resource, and possible implementation forms in standards, or the like, to describe the data transmission method provided in this application.

Figure 3:
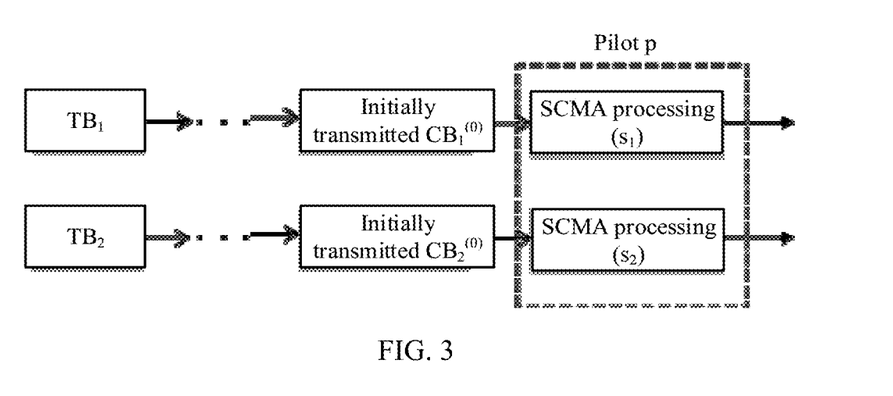
FIG. 3 is a schematic diagram of transmission in an example of a data transmission method according to this application.

FIG. 3 is a schematic diagram of transmission in an example of a data transmission method according to this application. As shown in FIG. 3, in this solution, it is assumed that in an uplink grant-free SCMA non-orthogonal transmission system (or a non-orthogonal transmission manner in another form), user equipment (UE) has two data packets to be initially transmitted at a moment. The two data packets are obtained by performing channel encoding on different TBs separately and are represented as $CB_1^{(0)}$ and $CB_2^{(0)}$ respectively, where the superscript 0 represents that the two data packets are both initially transmitted packets. The UE selects a corresponding transmission mode based on a quantity of data packets to be transmitted this time. The transmission mode corresponds to a signature sequence set $\{s_1, s_2\}$, and is used to perform SCMA multiple-access processing on $CB_1^{(0)}$ and $CB_2^{(0)}$ to obtain transmit sequences at two data layers and transmit the transmit sequences synchronously to a base station on a same time-frequency resource.

A transmission mode concept is introduced in the foregoing process. Different transmission modes correspond to different signature sequence sets. Therefore, when a plurality of signature sequences are indicated, a transmission mode may be directly indicated, so that a corresponding signature sequence set may be determined to obtain a plurality of required signature sequences. The UE may notify the base station (BS) of a selected transmission mode by using a pilot p. A correspondence between information about a pilot and a transmission mode is agreed upon in advance by the BS and the UE. The BS knows, based on the detected information about the pilot p and based on the agreed-upon correspondence between information about p and a transmission mode, that the UE transmits two packets at two data layers (by using signature sequences $s_1$ and $s_2$ respectively), and performs corresponding reception detection.

Optionally, the UE may alternatively notify the base station of the selected transmission mode by using control information, instead of establishing a mapping relationship between a pilot and a transmission mode (a signature sequence or a signature sequence set).

Figure 4:
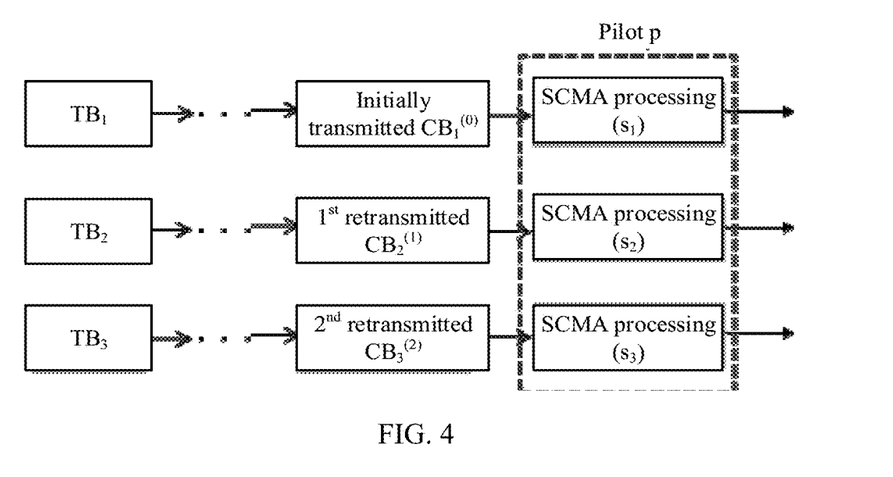
FIG. 4 is a schematic diagram of transmission in another example of a data transmission method according to this application.

FIG. 4 is a schematic diagram of transmission in another example of a data transmission method according to this application. As shown in FIG. 4, in this solution, it is assumed that in an uplink grant-free SCMA non-orthogonal transmission system, UE has three to-be-transmitted packets at a moment. The three data packets are obtained by performing channel encoding on different TBs separately and are represented as $CB_1^{(0)}$, $CB_2^{(1)}$, and $CB_3^{(2)}$ respectively. $CB_1^{(0)}$ is an initially transmitted packet of a data packet 1, $CB_2^{(1)}$ is a first-time retransmitted packet of a data packet 2, and $CB_3^{(2)}$ is a second-time retransmitted packet of a data packet 3. The UE may similarly select a corresponding transmission mode based on a quantity of data packets to be transmitted this time. The transmission mode corresponds to a signature sequence set $\{s_1, s_2, s_3\}$, and is used to perform SCMA multiple-access processing on) $CB_1^{(0)}$, $CB_2^{(1)}$, and $CB_3^{(2)}$ to obtain transmit sequences at three data layers and transmit the transmit sequences synchronously on a same time-frequency resource.

The UE may notify a BS of a selected transmission mode by using a pilot p, where a correspondence between a pilot and a transmission mode is agreed upon in advance by the BS and the UE. The base station knows, based on the detected information about the pilot p and based on the agreed-upon correspondence between information about p and a transmission mode, that the UE transmits three packets at three data layers (by using signature sequences $s_1$, $s_2$, and $s_3$ respectively), and performs corresponding reception detection.

The UE may alternatively notify the base station of the selected transmission mode by using control information, instead of establishing a mapping relationship between a pilot and a transmission mode (a signature sequence or a signature sequence set).

Optionally, in another specific implementation of this solution, it is assumed that in an uplink grant-based transmission SCMA system, the UE has two to-be-transmitted data packets at a moment. The two data packets are represented as $CB_1^{(1)}$ and $CB_2^{(2)}$ respectively, which are respectively a first-time retransmitted packet of a packet 1 and a second-time retransmitted packet of a packet 2. The UE indicates that there is to-be-transmitted uplink data by using a scheduling request (SR), and notifies, by using a buffer status report (BSR), the base station of an amount of data to be transmitted this time. The base station schedules required bandwidth for the UE based on the BSR, and notifies the UE of a transmission mode. The UE performs, according to the transmission mode within the scheduled bandwidth, multiple-access processing on $CB_1^{(1)}$ and $CB_2^{(2)}$ by respectively using two corresponding signature sequences ($s_1$ and $s_2$), and sends the data packets synchronously at two data layers.

The BS already knows the transmission mode used by the user equipment in uplink transmission, and may directly perform reception detection on the data packets transmitted at the data layers.

Figure 5:
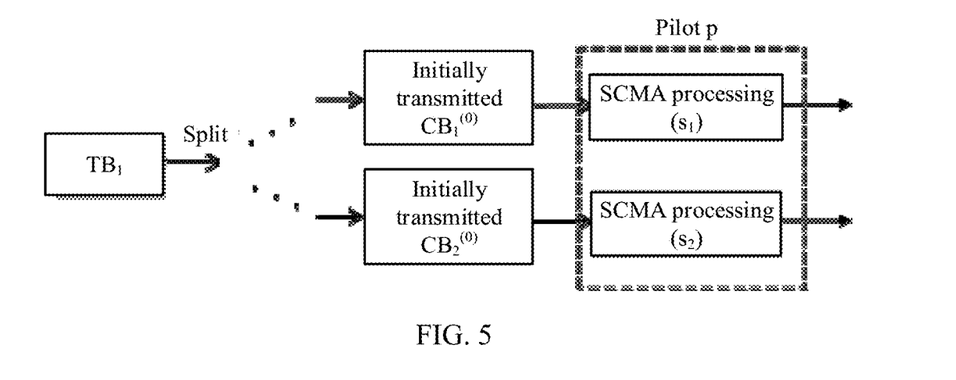
FIG. 5 is a schematic diagram of transmission in still another example of a data transmission method according to this application.

FIG. 5 is a schematic diagram of transmission in still another example of a data transmission method according to this application. As shown in FIG. 5, it is assumed that in an uplink grant-free SCMA non-orthogonal transmission system, UE has two data packets to be initially transmitted at a moment. The two data packets are obtained by splitting a same TB and performing channel encoding separately, and are represented as $CB_1^{(0)}$ and $CB_2^{(0)}$ respectively, where the superscript 0 represents that the two packets are both initially transmitted packets. The UE selects a corresponding transmission mode based on a quantity of data packets to be transmitted this time. The transmission mode corresponds to a signature sequence set $\{s_1, s_2\}$, and is used to perform SCMA multiple-access processing on $CB_1^{(0)}$ and $CB_2^{(0)}$ to obtain transmit sequences at two data layers and transmit the transmit sequences synchronously on a same time-frequency resource.

Similar to the foregoing solution, in this example, the UE may notify a BS of a selected transmission mode by using a pilot p, where a correspondence between a pilot and a transmission mode is agreed upon in advance by the BS and the UE. The BS knows, based on the detected pilot p and based on the agreed-upon correspondence between p and a transmission mode, that the UE transmits the two data packets at two data layers (by using signature sequences $s_1$ and $s_2$ respectively), and performs corresponding reception detection.

The UE may alternatively notify the base station of the selected transmission mode by using control information, instead of establishing a mapping relationship between a pilot and a transmission mode (a signature sequence or a signature sequence set).

It can be learned from the foregoing embodiments that, during specific implementation of this solution, $CB_1$ and $CB_2$ may be segments of one TB or may be different TBs. This is not limited in this solution.

Figure 6:
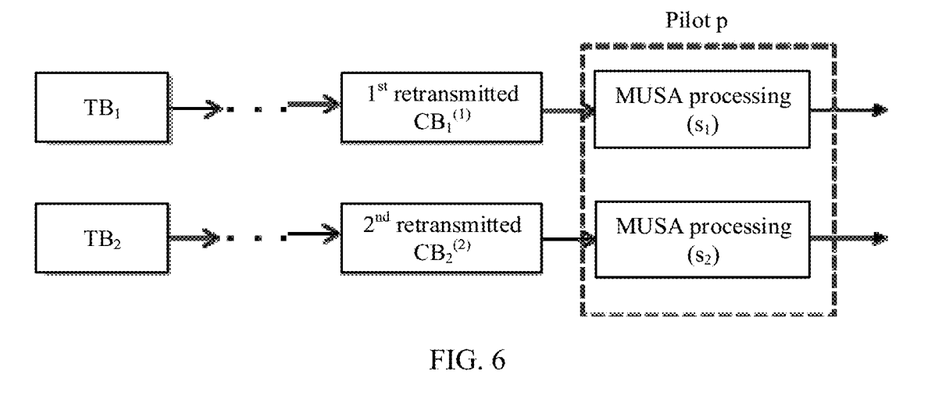
FIG. 6 is a schematic diagram of transmission in yet another example of a data transmission method according to this application.

FIG. 6 is a schematic diagram of transmission in yet another example of a data transmission method according to this application. As shown in FIG. 6, in the solution, it is assumed that in an uplink grant-free MUSA non-orthogonal transmission system, UE has two to-be-transmitted data packets at a moment. The data packets are obtained by performing channel encoding on different TBs separately and represented as $CB_1^{(1)}$ and $CB_2^{(2)}$, which are respectively a first-time retransmitted packet of a data packet 1 and a second-time retransmitted packet of a data packet 2. The UE selects a corresponding transmission mode based on a quantity of packets to be transmitted this time. The transmission mode corresponds to a MUSA signature sequence set $\{s_1, s_2\}$, and is used to perform MUSA multiple-access processing on $CB_1^{(1)}$ and $CB_2^{(2)}$ to obtain transmit sequences at two data layers and transmit the transmit sequences synchronously on a same time-frequency resource.

Similarly, the UE may notify a BS of a selected transmission mode by using a pilot p, where a correspondence between information about a pilot and a transmission mode is agreed upon in advance by the BS and the UE. The BS knows, based on the detected information about the pilot p and based on the agreed-upon correspondence between information about p and a transmission mode, that the UE transmits two packets at two data layers (by using signature sequences $s_1$ and $s_2$ respectively), and performs corresponding reception detection. The UE may alternatively notify the base station of the selected transmission mode by using control information, instead of establishing a mapping relationship between a pilot and a transmission mode (a signature sequence or a signature sequence set).

In addition to the foregoing solutions, this application further provides another data transmission solution. It is assumed that in an uplink grant-free SCMA non-orthogonal transmission system, UE has two data packets to be initially transmitted at a moment. The two data packets are obtained by performing channel encoding on different TBs separately, and are represented as $CB_1^{(0)}$ and $CB_2^{(0)}$ respectively. The two data packets are both initially transmitted data packets. The UE selects a corresponding transmission mode based on a quantity of packets to be transmitted this time. The transmission mode corresponds to a signature sequence set $\{\tilde{s}_1, \tilde{s}_2\}$, and is used to perform SCMA multiple-access processing on $CB_1^{(0)}$ and $CB_2^{(0)}$ to obtain transmit sequences at two data layers and transmit the transmit sequences synchronously on a same time-frequency resource. $\tilde{s}_1$ and $\tilde{s}_2$ are results obtained after original signature sequences $s_1$ and $s_2$ are processed. The processing process includes manners such as phase rotation and power allocation.

The UE may notify the BS of a selected transmission mode by using a pilot p. A correspondence between a pilot and a transmission mode is agreed upon in advance by the BS and the UE. The BS knows, based on the detected pilot p and based on the agreed-upon correspondence between p and a transmission mode, that the UE transmits two packets at two data layers (by using signature sequences $\tilde{s}_1$ and $\tilde{s}_2$ respectively), and performs corresponding reception detection. The UE may alternatively notify the base station of the selected transmission mode by using control information, instead of establishing a mapping relationship between a pilot and a transmission mode (a signature sequence or a signature sequence set).

Similarly, in this implementation, $CB_1$ and $CB_2$ may be segments of one TB or may be different TBs. This is not limited in this solution.

According to the data transmission method provided in any one of the foregoing implementations, in an uplink non-orthogonal multiple access system, the UE performs channel encoding on a plurality of data packets separately, performs multiple-access processing on the encoded data packets by respectively using different signature sequences to obtain transmit sequences, and sends the transmit sequences concurrently to the base station on a same time-frequency resource in a same slot, thereby effectively improving utilization of time-frequency resources, shortening a packet queuing time, increasing a potential maximum quantity of retransmissions, and improving transmission efficiency and reliability.

Figure 7:
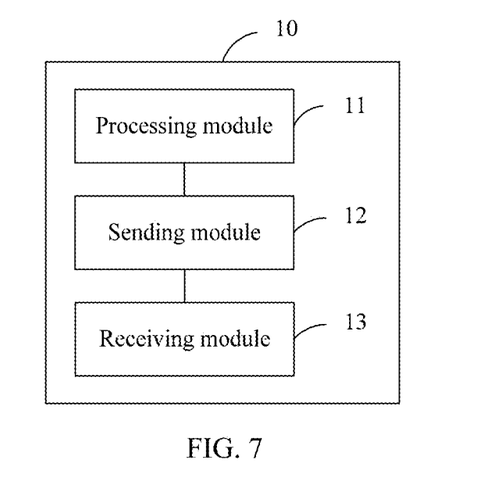
FIG. 7 is a schematic structural diagram of Embodiment 1 of a data transmission apparatus according to this application.

FIG. 7 is a schematic structural diagram of Embodiment 1 of a data transmission apparatus according to this application. As shown in FIG. 7, the data transmission apparatus 10 includes:

a processing module 11, configured to obtain at least two signature sequences used to perform multiple access for at least two to-be-sent data packets, where the processing module 11 is further configured to process the at least two data packets by respectively using corresponding signature sequences, to obtain at least two transmit sequences; and a sending module 12, configured to send the at least two transmit sequences to a network device on a same time-frequency resource.

In an implementation of the data transmission apparatus 10, the processing module 11 is specifically configured to select, from available signature sequences, signature sequences having a one-to-one correspondence with the data packets.

Optionally, the sending module 12 is further configured to send a pilot to the network device, where information about the pilot is used to indicate the at least two signature sequences used by the data transmission apparatus 10 to perform multiple access for the at least two data packets.

Optionally, the sending module 12 is further configured to send, to the network device through a control channel, control information used to indicate the at least two signature sequences.

In another implementation of the data transmission apparatus 10, the data transmission apparatus 10 further includes: a receiving module 13;

the sending module 12 is specifically configured to send scheduling information to the network device, where the scheduling information is used to indicate that the data transmission apparatus 10 needs to upload data and indicate an amount of data to be sent by the data transmission apparatus 10;

the receiving module 13 is configured to receive a scheduling acknowledgment message returned by the network device; and the processing module 11 is configured to determine the at least two signature sequences based on the scheduling acknowledgment message.

Optionally, the at least two data packets include: an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

The data transmission apparatus provided in any one of the foregoing implementations in FIG. 7 is configured to perform the technical solution on the user equipment side in any one of the foregoing method embodiments, and has similar implementation principles and technical effects. Details are not described herein again.

Figure 8:
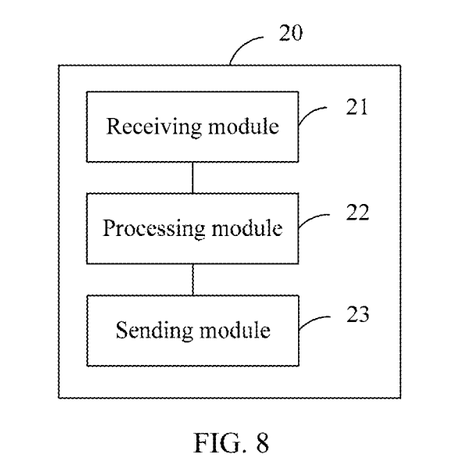
FIG. 8 is a schematic structural diagram of Embodiment 2 of a data transmission apparatus according to this application.

FIG. 8 is a schematic structural diagram of Embodiment 2 of a data transmission apparatus according to this application. As shown in FIG. 8, the data transmission apparatus 20 includes:

a receiving module 21, configured to receive at least two transmit sequences sent by user equipment; and a processing module 22, configured to obtain at least two signature sequences used by the user equipment to send the at least two transmit sequences.

The processing module 22 is further configured to separately detect a corresponding transmit sequence based on each signature sequence, to obtain at least two data packets.

In an implementation of the data transmission apparatus 20, the receiving module 21 is further configured to receive a pilot sent by the user equipment; and the processing module 22 is further configured to obtain the at least two signature sequences based on the pilot, where information about the pilot is used to indicate the at least two signature sequences used by the user equipment to send the at least two transmit sequences.

Optionally, the receiving module 21 is further configured to receive control information that is sent by the user equipment through a control channel and that is used to indicate the at least two signature sequences; and the processing module 22 is further configured to obtain the at least two signature sequences based on the control information.

In another implementation of the data transmission apparatus 20, the data transmission apparatus 20 further includes: a sending module 23;

the receiving module 21 is further configured to receive scheduling information sent by the user equipment, where the scheduling information is used to indicate that the user equipment needs to upload data and indicate an amount of data to be sent by the user equipment;

the processing module 22 is further configured to: schedule bandwidth for the user equipment based on the scheduling information, and select, from available signature sequences, signature sequences having a one-to-one correspondence with data packets indicated by the amount of data; and the sending module 23 is configured to return a scheduling acknowledgment message to the user equipment, where the scheduling acknowledgment message is used to indicate the at least two signature sequences.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

The data transmission apparatus provided in any one of the foregoing implementations in FIG. 8 is configured to perform the technical solution on the network device side in any one of the foregoing method embodiments, and has similar implementation principles and technical effects. Details are not described herein again.

Figure 9:
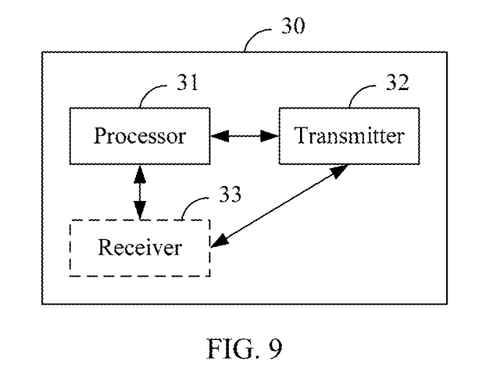
FIG. 9 is a schematic structural diagram of a user equipment embodiment according to this application.

FIG. 9 is a schematic structural diagram of a user equipment embodiment according to this application. As shown in FIG. 9, the user equipment 30 includes: a processor 31, configured to:

obtain at least two signature sequences used to perform multiple access for at least two to-be-sent data packets, and process the at least two data packets by respectively using corresponding signature sequences, to obtain at least two transmit sequences; and a transmitter 32, configured to send the at least two transmit sequences to a network device on a same time-frequency resource.

In an implementation, the processor 31 is specifically configured to select, from available signature sequences, signature sequences having a one-to-one correspondence with the data packets.

In another implementation, the transmitter 32 is further configured to send a pilot to the network device, where information about the pilot is used to indicate the at least two signature sequences used by the user equipment to perform multiple access for the at least two data packets.

Optionally, the transmitter 32 is further configured to send, to the network device through a control channel, control information used to indicate the at least two signature sequences.

Optionally, the user equipment further includes: a receiver 33;

the transmitter 32 is specifically configured to send scheduling information to the network device, where the scheduling information is used to indicate that the user equipment needs to upload data and indicate an amount of data to be sent by the user equipment;

the receiver 33 is configured to receive a scheduling acknowledgment message returned by the network device; and the processor 31 is configured to determine the at least two signature sequences based on the scheduling acknowledgment message.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

In the foregoing user equipment solution, the user equipment may further include a memory, and there is at least one processor configured to execute an execution instruction stored in the memory, so that the user equipment exchanges data with the network device through a communications interface, to perform the data transmission method provided in the foregoing embodiments or various implementations of the foregoing embodiments.

Figure 10:
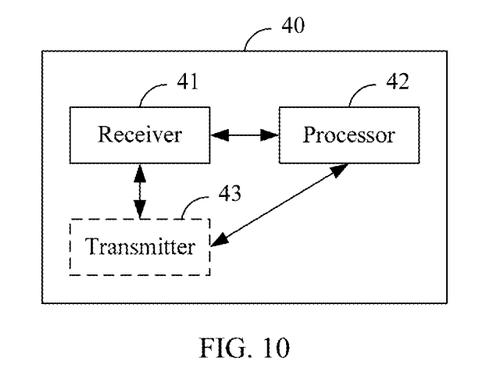
FIG. 10 is a schematic structural diagram of a network device embodiment according to this application.

FIG. 10 is a schematic structural diagram of a network device embodiment according to this application. As shown in FIG. 10, the network device 40 includes:

a receiver 41, configured to receive at least two transmit sequences sent by user equipment; and a processor 42, configured to:

obtain at least two signature sequences used by the user equipment to send the at least two transmit sequences; and separately detect a corresponding transmit sequence based on each signature sequence, to obtain at least two data packets.

In an implementation, the receiver 41 is further configured to receive a pilot sent by the user equipment; and the processor 42 is further configured to obtain the at least two signature sequences based on the pilot, where information about the pilot is used to indicate the at least two signature sequences used by the user equipment to send the at least two transmit sequences.

In another implementation, the receiver 41 is further configured to receive control information that is sent by the user equipment through a control channel and that is used to indicate the at least two signature sequences; and the processor 42 is further configured to obtain the at least two signature sequences based on the control information.

Optionally, the network device 40 further includes: a transmitter 43;

the receiver 41 is further configured to receive scheduling information sent by the user equipment, where the scheduling information is used to indicate that the user equipment needs to upload data and indicate an amount of data to be sent by the user equipment;

the processor 42 is further configured to: schedule bandwidth for the user equipment based on the scheduling information, and select, from available signature sequences, signature sequences having a one-to-one correspondence with data packets indicated by the amount of data; and the transmitter 43 is configured to return a scheduling acknowledgment message to the user equipment, where the scheduling acknowledgment message is used to indicate the at least two signature sequences.

Optionally, the at least two data packets include:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

The foregoing network device may further include a memory, and there is at least one processor configured to execute an execution instruction stored in the memory, so that the network device exchanges data with the user equipment through a communications interface, to perform the data transmission method provided in the foregoing embodiments or various implementations of the foregoing embodiments.

This application further provides a storage medium, including: a readable storage medium and an executable instruction, where the executable instruction is stored in the readable storage medium, and when at least one processor of user equipment executes the executable instruction, the user equipment performs the data transmission method provided in the foregoing implementations.

This application further provides a storage medium, including: a readable storage medium and an executable instruction, where the executable instruction is stored in the readable storage medium, and when at least one processor of a network device executes the executable instruction, the network device performs the data transmission method provided in the foregoing implementations.

This application further provides a program product, where the program product includes an executable instruction, and the executable instruction is stored in a readable storage medium. At least one processor of user equipment may read the executable instruction from the readable storage medium, and the at least one processor executes the executable instruction, so that the user equipment implements the data transmission method provided in the foregoing implementations.

This application further provides a program product, where the program product includes an executable instruction, and the executable instruction is stored in a readable storage medium. At least one processor of a network device may read the executable instruction from the readable storage medium, and the at least one processor executes the executable instruction, so that the network device implements the data transmission method provided in the foregoing implementations.

The executable instruction in the foregoing solutions is also referred to as a computer instruction, a computer program, or the like. This is not limited in this solution.

In the foregoing user equipment embodiments or network device embodiments, it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the method disclosed with reference to this application may be directly performed by a hardware processor, or may be performed by using a combination of hardware in the processor and a software module.

All or some of the steps for implementing the foregoing method embodiments may be implemented by a program instructing related hardware. The program may be stored in a readable memory. When the program is executed, the steps in the foregoing method embodiments are performed. The memory (storage medium) includes: a read-only memory (ROM), a RAM, a flash memory, a hard disk, a solid state disk, a magnetic tape, a floppy disk, an optical disc, and any combination thereof.

Finally, it should be noted that the foregoing embodiments are only used to describe rather than limit the technical solutions in this application.

What is claimed is:

1. A data transmission method, the method comprising:
obtaining, by a user equipment, at least two signature sequences based on a scheduling acknowledgment message sent by a network device, wherein the at least two signature sequences are used to perform multiple access for at least two to-be-sent data packets;
processing, by the user equipment, the at least two to-be-sent data packets by respectively using corresponding signature sequences, to obtain at least two transmit sequences; and
sending, by the user equipment, the at least two transmit sequences to the network device on a same time-frequency resource.

2. The method according to claim 1, wherein the obtaining, by user equipment, at least two signature sequences based on a scheduling acknowledgment message sent by a network device comprises:
selecting, by the user equipment from available signature sequences, signature sequences having a one-to-one correspondence with the at least two to-be-sent data packets.

3. The method according to claim 2, wherein the method further comprises:
sending, by the user equipment, a pilot to the network device, wherein information about the pilot is used to indicate the at least two signature sequences used by the user equipment to perform multiple access for the at least two to-be-sent data packets.

4. The method according to claim 2, wherein the method further comprises:
sending, by the user equipment and to the network device through a control channel, control information used to indicate the at least two signature sequences.

5. The method according to claim 1, wherein the obtaining, by the user equipment, at least two signature sequences used to perform multiple access for at least two to-be-sent data packets comprises:
sending, by the user equipment, scheduling information to the network device, wherein the scheduling information is used to indicate that the user equipment needs to upload data and indicate an amount of data to be sent by the user equipment;
receiving, by the user equipment, the scheduling acknowledgment message returned by the network device; and
determining, by the user equipment, the at least two signature sequences based on the scheduling acknowledgment message.

6. The method according to claim 1, wherein the at least two to-be-sent data packets comprise:
an initially transmitted packet of a first data packet and an initially transmitted packet of a second data packet; or
an initially transmitted packet of a first data packet and a retransmitted packet of a second data packet; or
a retransmitted packet of a first data packet and a retransmitted packet of a second data packet.

7. A data transmission method, the method comprising:
receiving, by a network device, at least two transmit sequences sent by a user equipment, wherein the at least two transmit sequences are sent using at least two signature sequences, the at least two signature sequences obtained by the user equipment based on a scheduling acknowledgment message sent by the network device;
obtaining, by the network device, the at least two signature sequences used by the user equipment to send the at least two transmit sequences; and
separately detecting, by the network device, a corresponding transmit sequence based on each signature sequence, to obtain at least two data packets.

8. The method according to claim 7, wherein the obtaining, by the network device, the at least two signature sequences used by the user equipment to send the at least two transmit sequences comprises:
receiving, by the network device, a pilot sent by the user equipment; and
obtaining the at least two signature sequences based on the pilot, wherein information about the pilot is used to indicate the at least two signature sequences used by the user equipment to send the at least two transmit sequences.

9. The method according to claim 7, wherein the obtaining, by the network device, the at least two signature sequences used by the user equipment to send the at least two transmit sequences comprises:
receiving, by the network device, control information that is sent by the user equipment through a control channel and that is used to indicate the at least two signature sequences; and
obtaining the at least two signature sequences based on the control information.

10. The method according to claim 7, wherein, before the receiving, by a network device, at least two transmit sequences sent by user equipment, the method further comprises:
receiving, by the network device, scheduling information sent by the user equipment, wherein the scheduling information is used to indicate that the user equipment needs to upload data and indicate an amount of data to be sent by the user equipment;
scheduling, by the network device, bandwidth for the user equipment based on the scheduling information;
selecting, from available signature sequences, signature sequences having a one-to-one correspondence with data packets indicated by the amount of data; and
returning, by the network device, a scheduling acknowledgment message to the user equipment, wherein the scheduling acknowledgment message is used to indicate the at least two signature sequences.

11. The method according to claim 7, wherein the at least two data packets comprise:
an initially transmitted packet of a first data packet and an initially transmitted packet of a second data packet; or
an initially transmitted packet of a first data packet and a retransmitted packet of a second data packet; or
a retransmitted packet of a first data packet and a retransmitted packet of a second data packet.

12. A data transmission apparatus, the data transmission apparatus comprising:
at least one processor;
a non-transitory memory coupled to the at least one processor and storing execution instructions for execution by the at least one processor, the execution instructions instructing the at least one processor to:
obtain at least two signature sequences based on a scheduling acknowledgment message sent by a network device, wherein the at least two signature sequences are used to perform multiple access for at least two to-be-sent data packets;

process the at least two to-be-sent data packets by respectively using corresponding signature sequences, to obtain at least two transmit sequences; and send the at least two transmit sequences on a same time-frequency resource.

13. The data transmission apparatus according to claim 12, wherein the execution instructions instruct the at least one processor to select, from available signature sequences, signature sequences having a one-to-one correspondence with the at least two to-be-sent data packets.

14. The data transmission apparatus according to claim 13, wherein the execution instructions further instruct the at least one processor to send a pilot, and wherein information about the pilot is used to indicate the at least two signature sequences used by the data transmission apparatus to perform multiple access for the at least two to-be-sent data packets.

15. The data transmission apparatus according to claim 13, wherein the execution instructions instruct the at least one processor to send, through a control channel, control information used to indicate the at least two signature sequences.

16. The data transmission apparatus according to claim 12, wherein the data transmission apparatus further comprises: a receiver;

wherein the execution instructions instruct the at least one processor to send scheduling information, wherein the scheduling information is used to indicate that the data transmission apparatus needs to upload data and indicate an amount of data to be sent by the data transmission apparatus;

wherein the receiver is configured to receive the scheduling acknowledgment message returned by a network device; and wherein the execution instructions further instruct the at least one processor to determine the at least two signature sequences based on the scheduling acknowledgment message.

17. The data transmission apparatus according to claim 12, wherein the at least two to-be-sent data packets comprise:

an initially transmitted packet of a first data packet and an initially transmitted packet of a second data packet; or an initially transmitted packet of a first data packet and a retransmitted packet of a second data packet; or a retransmitted packet of a first data packet and a retransmitted packet of a second data packet.

* * * * *